Feb. 28, 1928.
A. E. JONES
1,660,336
SEDIMENT REMOVER
Filed March 3, 1924
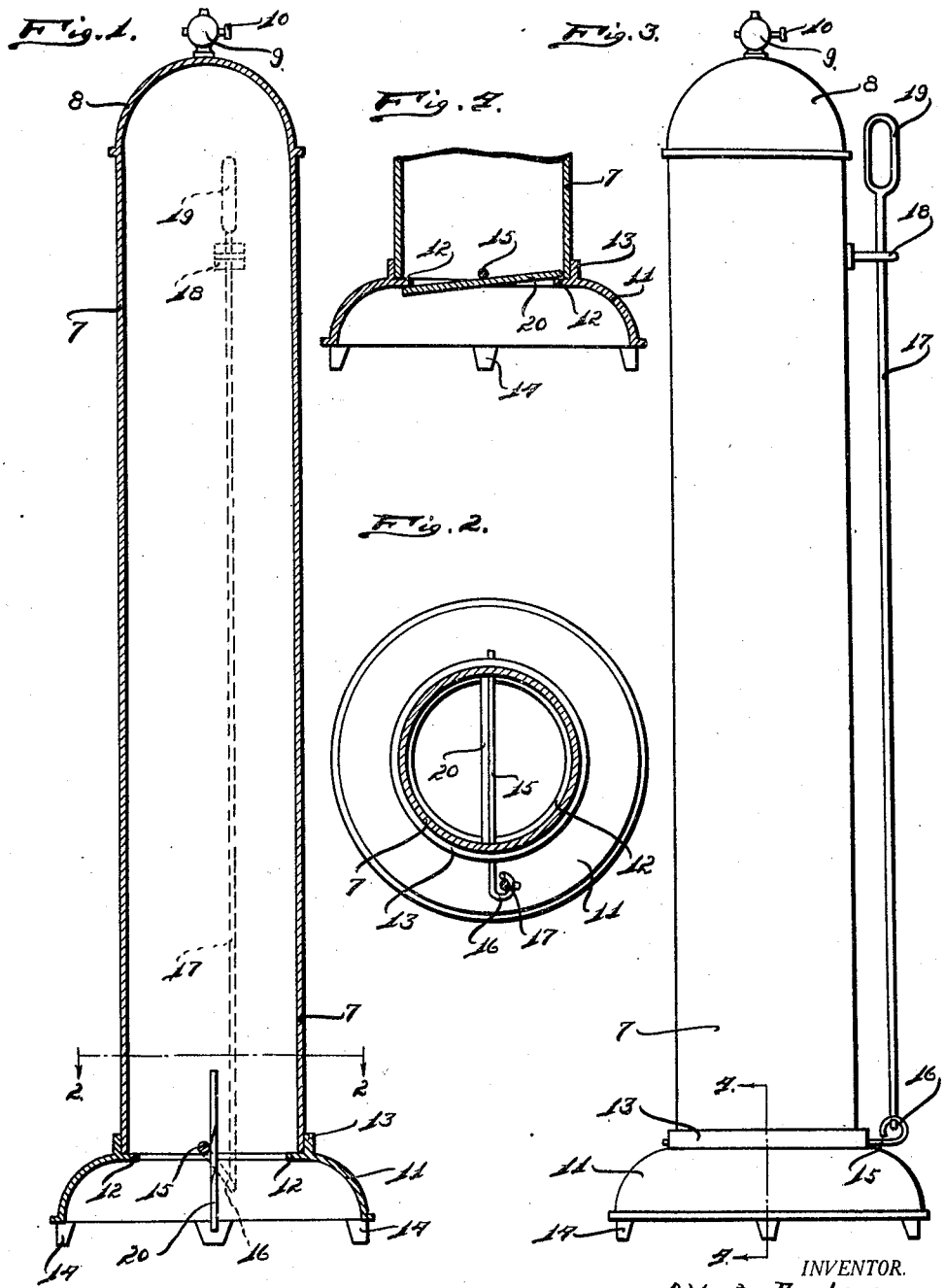
INVENTOR.
Albert E. Jones.
BY
Thos. L. Donnelly
ATTORNEY.

Patented Feb. 28, 1928.

1,660,336

UNITED STATES PATENT OFFICE.

ALBERT E. JONES, OF DETROIT, MICHIGAN.

SEDIMENT REMOVER.

Application filed March 3, 1924. Serial No. 696,715.

My invention relates to a new and useful improvement in a sediment remover and has for its object the provision of a device adapted for removing sediment from the body of tanks and the like which will be simple in structure, economical of manufacture, and highly efficient in use.

Another object of the invention is the provision of a sediment remover which will afford a maximum amount of entrance and exit space for permitting the rapid and ready filling and emptying of the container embodied in the invention.

Another object of the invention is the provision of a sediment remover having means for closing the opening through which the sediment enters and exits, said means affording a lifting handle for raising the same.

Another object of the invention is the provision of a sediment remover having a valve for closing the entrance and exit opening, said valve being provided with a lifting handle whereby the valve is held securely closed during the lifting operation.

Other objects will appear hereinafter.

The invention consists in the combinations and arrangements of parts hereinafter described and claimed.

The invention will be best understood from a reference to the accompanying drawings which form a part of this specification and in which, Fig. 1 is a longitudinal vertical sectional view of the invention, Fig. 2 is a sectional view taken on substantially line 2—2 of Fig. 1, Fig. 3 is a side elevational view of the invention, Fig. 4 is a fragmentary sectional view taken on substantially line 4—4 of Fig. 3.

The invention in its preferred form comprises an elongated cylindrical tank, or casing, 7 having a bell-shaped cap, or closure 8 mounted on the upper end thereof. The cap, or closure, may be welded to the cylindrical member 7, or crimped thereon, as desired. The joining of the cap 8 to the portion 7 must be such as to provide an air tight joint. The cap 8 is provided, at its upper end, with a valve 9 communicating with the interior of the tank or casing 7 and provided with a suitable stop cock 10 for opening and closing the valve to permit communication of the interior of the casing 7 with the atmosphere. Mounted on the cylindrical casing 7 is a suitable concave base 11 of greater diameter at its open end than the casing 7, and having a flange 12 extending inwardly of the casing 7 and provided with an upwardly extending flange or collar 13 adapted to embrace the periphery of the casing or shell 7. The base is also provided with legs 14. It is preferred to form the base from a single casting, although this particular method of structure is left optional with the one making the device. The cylindrical shell, or casing, 7 may be soldered to the base, or welded, or otherwise attached, as desired, the connections at this point not having to be air tight inasmuch as this end will be inserted into the liquid before operation of the device. Projected through the cylindrical casing 7 and through the collar 13 is a rod 15 having the outer end thereof turned to form a crank or eyelet 16 in which is fastened a rod 17 projecting upwardly of the casing and journalled in a bracket 18 mounted on the side thereof. The upper end of the rod 17 is provided with a hand hold 19 whereby the rod may be reciprocated longitudinally of the casing 7. Mounted on the rod 15 interiorly substantially of the casing is a disc or valve 20, one half of which is adapted to engage against the upper surface of the flange 12 and the other half of it is adapted to engage against the lower surface of the flange 12, thus securely closing the opening of the casing or shell 7.

In operation, the valve 9 is closed and the device is then inserted into the liquid from which the sediment is desired to be removed. As the device is lowered into the liquid, the air contained within the cylindrical casing 7 prevents, to any great extent, the entry of the liquid into the interior of the casing. When the lower portion of the casing is brought into engagement with the sediment, the valve 9 may then be opened and the atmospheric pressure will cause the liquid at the bottom of the container in which it is positioned to rush into the shell 7, the valve 20 being in this instance turned to the position shown in Fig. 1. By moving the device over the bottom of the container in which the sediment is found, the entire surface of the bottom may be quickly and easily covered. When the atmospheric pressure within the shell 7 and exteriorly thereof has been equalized, the valve 20 may then be closed by drawing upwardly on the rod 17 and the shell 7 with its contents removed. It is to be noted that with a valve mounted, as shown, substantially the entire surface of the opening leading into the casing 7 is unobstructed to permit the passage of fluid thereinto. This feature permits the rapid filling of the casing and also the quick emptying of the same.

It is also to be noted that the hand hold 19 may serve as a lifting or carrying means for the casing and when so used, it serves to maintain the valve 20 in a tightly closed position, thus serving a double pressure. The base 11 and the legs 14 serve to support the casing 7 above a surface upon which the device may be positioned sufficiently to permit free and easy operation of the disc 20 on the rod 15 as a pivot.

While I have illustrated and described the preferred form of structure, I do not wish to limit myself to the precise form of structure shown but desire to avail myself of such variations and modifications as come within the scope of the appended claims.

Having thus described my invention what I claim as new and desire to secure by Letters Patent is:

1. A sediment remover comprising a cylindrical casing of uniform diameter throughout its length, the lower end thereof being open throughout its entire area; a cap for closing the upper end of said casing in an airtight connection; a valve mounted in said cap for controlling passage of air from said casing; a base mounted on the lower end of said casing having a flange projecting interiorly slightly of the inner surface of said casing; a rod projected through said casing, adjacent its lower end, diametrically thereof; a circular disc mounted diametrically on said rod and adapted upon rocking of said rod in one direction a predetermined distance, for closing the lower end of said casing, one half of said disc, when moved to closing position, engaging on its undersurface, adjacent its periphery, the upper surface of one half of said interiorly projecting flange, and for engaging on its upper surface, throughout the other half, the undersurface of the other half of said interiorly projecting flange; and means extending longitudinally of said casing for rocking said rod at will, said base retaining said casing positioned above a supporting surface sufficiently to permit rocking of said disc to vertical position on said rod.

2. A sediment remover comprising a casing open throughout its entire area at its lower end; a valve mounted in the opposite end for controlling passage of air from said casing; a base mounted on the open end of said casing; a flange on said base projecting interiorly of said casing; a collar projecting upwardly from said base and embracing the lower end of said casing; a rod projected through said collar and said casing diametrically thereof; a circular disc mounted diametrically on said rod and adapted upon rocking in one direction a predetermined distance for closing the lower end of said casing, said disc, when moved to closing position, engaging said inwardly projecting flange; legs on said base, said legs being extended outwardly and downwardly from the axis of said disc a distance not less than one-half of the diameter of said disc for permitting the rocking of said disc to vertical position upon the engagement of said legs with a supporting surface, said base being concave and of larger diameter than said casing.

In testimony whereof I have signed the foregoing specification.

ALBERT E. JONES.